US010052968B2

(12) United States Patent
Chung et al.

(10) Patent No.: US 10,052,968 B2
(45) Date of Patent: Aug. 21, 2018

(54) METHOD AND SYSTEM FOR DIAGNOSING FUEL CELL STACK

(71) Applicant: Hyundai Motor Company, Seoul (KR)

(72) Inventors: Sung Jin Chung, Gyeonggi-Do (KR); Ja Hoo Koo, Gyeonggi-Do (KR); Joon Yong Lee, Seoul (KR); Soon Woo Kwon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 665 days.

(21) Appl. No.: 14/616,229

(22) Filed: Feb. 6, 2015

(65) Prior Publication Data

US 2016/0096445 A1    Apr. 7, 2016

(30) Foreign Application Priority Data

Oct. 6, 2014   (KR) .................. 10-2014-0134365

(51) Int. Cl.
*B60L 11/18*    (2006.01)

(52) U.S. Cl.
CPC ....... *B60L 11/1881* (2013.01); *Y02T 10/7005* (2013.01)

(58) Field of Classification Search
CPC ................................................ B60L 11/1881
See application file for complete search history.

(56) References Cited

U.S. PATENT DOCUMENTS 9,178,231 B2 * 11/2015 Horiuchi ........... H01M 8/04126
2013/0260272 A1 * 10/2013 Horiuchi ........... H01M 8/04126
429/423

FOREIGN PATENT DOCUMENTS

| JP | 09-027336 | 1/1997 |
| JP | 09-0277336 | 1/1997 |
| JP | 2008-123783 A | 5/2008 |
| JP | 5086570 B2 | 11/2012 |
| JP | 5141937 B2 | 2/2013 |
| KR | 10-2009-0053961 A | 5/2009 |
| KR | 10-1308254 | 9/2013 |

* cited by examiner

*Primary Examiner* — Seahvosh Nikmanesh
(74) *Attorney, Agent, or Firm* — Mintz Levin Cohn Ferris Glovsky and Popeo, P.C.; Peter F. Corless

(57) ABSTRACT

A system and method for diagnosing a fuel cell stack are provided. The method includes determining, by a controller, a time at which diagnosing the fuel cell stack is required based on a plurality of factors and driving a motor adjusted to a first efficiency value for a predetermined first reference time period based on the diagnosis determination. In addition, the controller is configured to drive the motor adjusted to a second efficiency value when the first reference time period has elapsed. A state of the fuel cell stack is then diagnosed based on a voltage variance of the fuel cell stack between driving the motor adjusted to the first efficiency value and second efficiency value.

20 Claims, 6 Drawing Sheets

METHOD AND SYSTEM FOR DIAGNOSING FUEL CELL STACK

CROSS REFERENCE TO RELATED APPLICATION

The present application claims priority of Korean Patent Application Number 10-2014-0134365 filed on Oct. 6, 2014, the entire contents of which application are incorporated herein for all purposes by this reference.

BACKGROUND

1. Field of the Invention

The present invention relates generally to a method and system for diagnosing a fuel cell stack and, more particularly, to a method and system for more accurately diagnosing a state of a fuel cell stack based on control logic between control devices.

2. Description of the Related Art

A fuel cell vehicle is a type of vehicle that includes a fuel cell stack that laminates multiple fuel cells used as a power source; a fuel supply system that supplies hydrogen which is a fuel for the fuel cell stack; an air supply system that supplies oxygen which is an oxidant necessary for electrochemical reactions; and a water and heat management system that adjusts a temperature of the fuel cell stack. The fuel supply system decompresses compressed hydrogen within a hydrogen tank and supplies the hydrogen to a fuel electrode (anode) of the stack. In addition, the air supply system supplies air suctioned from exterior using an air blower to an air electrode (cathode) of the stack.

When hydrogen and air are provided to the fuel electrode and air electrode of the stack, respectively, hydrogen ions are extracted through a catalysis reaction at the fuel electrode. The separated hydrogen ions are delivered to the anode through an electrolyte membrane, and the hydrogen ions and electrons from the fuel electrode produce an electrochemical reaction with oxygen to generate electric energy at the anode. Specifically, an electrochemical oxidation of hydrogen at the fuel electrode and electrochemical reduction of oxygen at the air electrode induces the electrons to move, and moving of the electrons generates electricity and heat. Additionally, water vapor or water is generated by the chemical action of combining hydrogen with oxygen.

An emission device is arranged to emit unreacted hydrogen and oxygen, and by-products produced in the procedure of the electric energy generation such as water vapor, water, and heat. Further, gases such as water vapor, hydrogen, and oxygen are emitted to the air through a ventilation hood. Components for operating a fuel cell, such as an air blower, a hydrogen recirculation blower, a water pump, and the like, are connected to a main bus terminal to facilitate an operation of the fuel cell. The main bus terminal may be connected to various relays for facilitating power interruption and connection, and a diode for preventing a back current.

Dry air supplied through the air blower is humidified by a humidifier, and is then supplied to a cathode of the fuel cell stack. The exhaust gas of the cathode, which has substantially high humidity due to the water generated therein, is transferred to the humidifier, and may be used to humidify dry air to be supplied to the cathode by the air blower. Further, a state and performance of a fuel cell stack is determined by high-precision response to operating conditions such as an air temperature, coolant temperature, and current. Continuous driving under poor operating conditions causes performance degradation of the fuel cell, and leads to potential failure to produce adequate output power demanded by a driver in the short term. Also, in the long term, this may cause durability deterioration and reduction of a life cycle of the fuel cell.

Moreover, dry-out of the stack is attributable to two main causes including a dry-out that occurs at a substantially high temperature and high output, and another dry-out that occurs at a substantially low output. The dry-out at a high temperature and high output occurs from losing a heat balance within the stack; while the low output dry-out occurs due to air oversupply. When dry-out of the fuel cell stack occurs, output of the fuel cell stack decreases, and the time required to recover normal output increases. Accordingly, it is necessary to detect whether dry-out of the fuel cell stack occurs, and to adjust conditions to rapidly recover from the dry-out via stack recovery driving.

For diagnosing a state of the fuel cell stack, a dry-out state caused by long-term deterioration of the fuel cell stack and shortage of water content within a membrane electrode assembly may be determined using an ohmic value. To measure the ohmic value, an interrupter disposed between the fuel cell stack and external energy consumption device may be used. The ohmic value may be measured based on a sudden increase in voltage that results from temporarily interrupting a current flow in the fuel cell stack. However, using the interrupter may create a heat problem within the external energy consumption device, and may contribute to the lack of durability of the interrupter or external energy consumption device.

SUMMARY

Accordingly, the present invention has been made keeping in mind the above problems, and an object of the present invention provides a method and system for diagnosing a state of a fuel cell stack using cooperative control logic between controllers without an external energy consumption device and resistance analyzer.

A method for diagnosing a fuel cell stack according to an exemplary embodiment of the present invention may include: determining a time at which diagnosing a fuel cell stack is required based on multiple factors; driving a motor adjusted to a first efficiency value for a predetermined first reference time period from the time of determining that diagnosing is required; driving the motor adjusted to a second efficiency value after the first reference time period has elapsed; and diagnosing a state of the fuel cell stack based on a voltage variance of the fuel cell stack between driving the motor adjusted to the first efficiency value and second efficiency value.

The process of determining a time at which diagnosing a fuel cell stack is required may include determining whether a variance of an output current of the fuel cell stack is less than a predetermined variance. The process of driving a motor adjusted to the first efficiency value may be performed in response to determining that the fuel cell stack diagnosis is necessary and the variance of the output current is less than the predetermined variance. In particular, the first efficiency value may be less than the second efficiency value. An output of the motor in the process of driving the motor adjusted to the first efficiency value may be the same as that in the process of the driving the motor adjusted to the second efficiency value.

The process of diagnosing a state of the fuel cell stack may include collecting data regarding a voltage variance by measuring the voltage variance of the fuel cell stack, and diagnosing a state of the fuel cell stack by analyzing a resistance value based on the collected data. Before the process of driving the motor adjusted to the first efficiency value, the method may further include stopping an operation of a power conversion controller, which controls charge/discharge of a high voltage battery between the high voltage battery and the fuel cell stack. The method may include resuming the operation of the power conversion controller when the first reference time period and second reference time period have elapsed.

Additionally, a method for diagnosing a fuel cell stack according to an exemplary embodiment of the present invention may include: determining whether a variance of an output current of the fuel cell stack is less than a predetermined variance, whether diagnosing the fuel cell stack is required, and whether a motor controller and power conversion controller are in a normal state; transmitting the motor controller instructions for initiating a fuel cell stack diagnosis based on the diagnosis determination, and stopping an operation of the power conversion controller, the instruction being for driving a motor adjusted to a first efficiency value during a predetermined first reference time period; transmitting the motor controller instructions for terminating a fuel cell stack diagnosis when the predetermined first reference time period has elapsed, and resuming the operation of the power conversion controller, the instruction being for driving the motor adjusted to the second efficiency value; and diagnosing the state of the fuel cell stack based on a voltage variance of the fuel cell stack between driving the motor adjusted to the first efficiency value and second efficiency value.

Furthermore, a system for diagnosing a fuel cell stack according to an exemplary embodiment of the present invention may include: a fuel cell controller configured to diagnose a state of the fuel cell stack by determining a time at which diagnosing a fuel cell stack is required based on multiple factors; and a motor controller configured to drive a motor adjusted to a first efficiency value for a predetermined first reference time period based on a diagnosis determination, driving the motor adjusted to a second efficiency value when the first reference time period has elapsed, and transmitting to the fuel cell controller a resistance value analyzed based on a voltage variance of the fuel cell stack between driving the motor adjusted to the first efficiency value and second efficiency value.

The fuel cell controller may be configured to diagnose the state of the fuel cell based on the transmitted resistance value. The fuel cell controller may further be configured to determine whether a variance of an output current of the fuel cell stack is less than a predetermined variance. Additionally, the fuel cell controller may be configured to operate the motor controller to drive the motor adjusted to a first efficiency value when diagnosing the fuel cell stack is required and the variance of the output current is less than the predetermined variance.

The system may further include a power conversion controller configured to charge/discharge of a high voltage battery between the high voltage battery and the fuel cell stack, and the fuel cell controller may be configured to determine whether the power conversion controller and motor controller are in a normal state. The fuel cell controller may further be configured to stop an operation of the power conversion controller and operate the motor controller to drive the motor adjusted to the first efficiency value in response to determining that the power conversion controller and motor controller are in a normal state.

The first efficiency value may be less than the second efficiency value. The output of the motor when driving the motor adjusted to the first efficiency value may be the same as that when driving the motor adjusted to the second efficiency value. The fuel cell controller may be configured to resume the operation of the power conversion controller when the first reference time period and second reference time period have elapsed.

A method for diagnosing a fuel cell stack according to an exemplary embodiment of the present invention has an effect of analyzing an ohmic value through cooperative control logic among a fuel cell controller, motor controller, and power conversion controller without equipping with a separate energy consumption device and ohmic value analyzer. Accordingly, a durability problem related to the external energy consumption device may be solved. In addition, it may be possible to continuously and more accurately diagnose a state of the fuel cell stack using the current configuration of the fuel cell system without additional hardware devices even when a variance of the output current of the fuel cell stack is substantially low.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
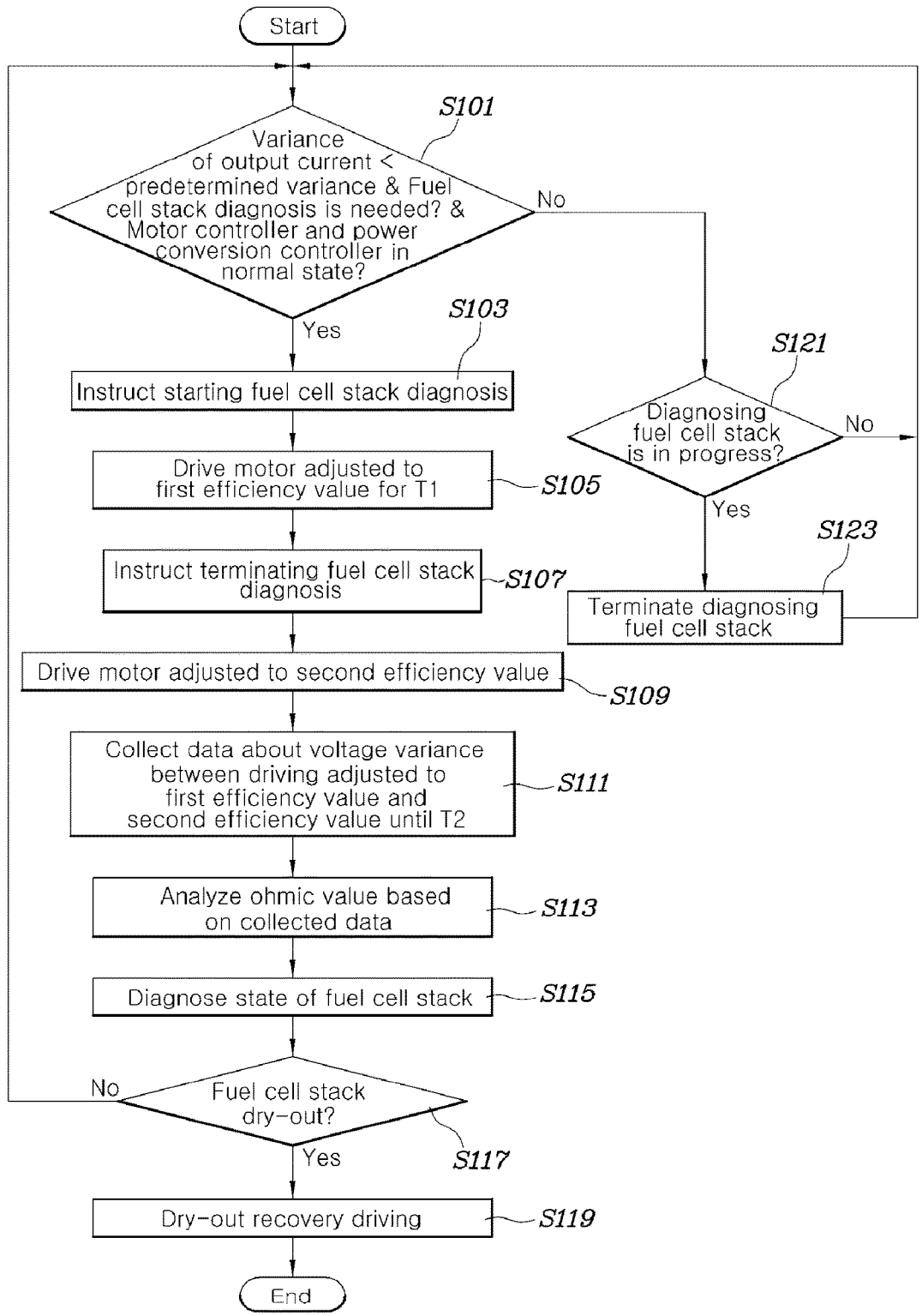
FIG. 1 is an exemplary flowchart illustrating a method for diagnosing a fuel cell stack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific structural or functional descriptions in the exemplary embodiments of the present invention disclosed in the specification or application are merely for description of the embodiments of the present invention. The descriptions can be embodied in various forms and should not be construed as being limited to the exemplary embodiments described in the specification or application.

Specific exemplary embodiments are illustrated in the drawings and described in detail in the specification or application because the exemplary embodiments of the present invention may have various forms and modifications. It should be understood, however, that there is no intent to limit the embodiments of the present invention to the specific exemplary embodiments, but the intention is to cover all modifications, equivalents, and alternatives included to the scope of the present invention.

Although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference now should be made to the drawings, in which the same reference numerals are used throughout the different drawings to designate the same or similar components.

Figure 2:
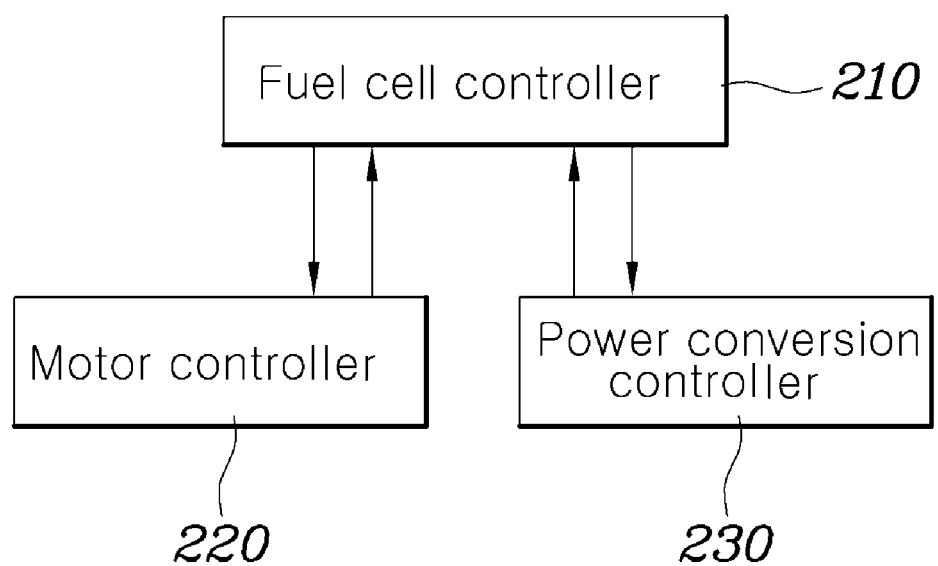
FIG. 2 is an exemplary simplified block diagram for components of a fuel cell stack diagnostic system according to an exemplary embodiment of the present invention.

FIG. 1 is an exemplary flowchart illustrating a method for diagnosing a fuel cell stack according to an exemplary embodiment of the present invention, and FIG. 2 is an exemplary simplified block diagram for components of a fuel cell stack diagnostic system according to an exemplary embodiment of the present invention. A fuel cell stack diagnostic system 200 according to an exemplary embodiment of the present invention may include: a fuel cell controller 210, a motor controller 220, and a power conversion controller 230. The fuel cell controller 210 may be configured to communicate with the motor controller 220 and power conversion controller 230, and may operate the whole fuel cell system. The motor controller 220 may be configured to operate a motor (not illustrated) using an inverter (not illustrated). The power conversion controller 230 disposed between a fuel cell stack and a high voltage battery, may be configured to execute charge and discharge of the high voltage battery.

Moreover, the fuel cell controller 210 may be configured to determine a time at which diagnosing a fuel cell stack is required based on multiple factors (S101). The multiple factors may include a temperature, cell voltage distribution, total voltage, and elapsed operation time of the fuel cell stack, but are not limited to the aforementioned. In other words, to determine a time at which a fuel cell stack diagnosis is necessary (e.g., when the diagnosis is required), the fuel cell controller may be configured to determine a time for specifically determining whether the dry out occurs when particular conditions are satisfied, which may be predetermined according to multiple factors including the elapsed operation time of a fuel cell vehicle, fuel cell stack temperature, etc.

In particular, the fuel cell controller 210 may be configured to monitor whether a variance of an output current of the fuel cell vehicle is proper. In other words, the fuel cell controller 210 may be configured to determine whether the variance of output current of the fuel cell vehicle is less than a predetermined variance because the output current variance may be determined since there may be an error in the range of a voltage variance to be measured at a transient section in which the variance of the output current is substantially high. Additionally, the fuel cell controller 210 may be configured to determine whether the motor controller 220 and power conversion controller 230 are in a normal state. In other words, when the fuel cell controller 210 transmits instructions to the motor controller 220 and power conversion controller 230, respectively, whether the motor controller 220 and the power conversion controller 230 may operate according to the instructions by properly receiving the instructions may be determined. In other words, the normal state may refer to the controllers operating based on received instructions without failure or errors.

The fuel cell controller 210 may be configured to start diagnosing the fuel cell stack in response to determining that the diagnosis of the fuel cell stack is required; a variance of an output current is less than a predetermined variance; and the motor controller 220 and power conversion controller 230 are in a normal state (S103). In other words, the fuel cell controller 210 may be configured to transmit the motor controller 220 instructions for initiating the fuel cell stack diagnosis.

On the other hand, in response to determining that the fuel cell stack diagnosis is not required; a variance of an output current of the fuel cell stack may be the predetermined variance or greater; or the motor controller 220 and power conversion controller 230 are not in a normal state (e.g., are in a state of error or failure), the fuel cell controller 210 may be configured to determine whether the fuel cell stack diagnosis is now in progress (S121). In response to determining that the fuel cell stack diagnosis is in progress, the fuel cell controller 210 may be configured to terminate the fuel cell stack diagnosis (S123).

The motor controller 220 may be configured to drive a motor adjusted to a first efficiency value for a predetermined first reference time period based on the instruction for initiating the fuel cell stack diagnosis (S105). Additionally, for a hybrid driving mode, the fuel cell controller 210 may be configured to stop an operation of the power conversion controller 230 by transmitting the power conversion controller 230 instructions for stopping the operation. The stopping of the operation of the power conversion controller 230 may interrupt a current flow between the high voltage battery and the fuel cell stack through the power conversion controller 230 since it may only be necessary to interrupt current to the fuel cell stack. Further, for a driving mode using a fuel cell, the fuel cell controller 210 may not be required operate the power conversion controller 230.

The motor controller 220 may be configured to operate drive a motor adjusted to a first efficiency value for a predetermined first reference time period (S105). When the predetermined first time period has elapsed, the fuel cell controller 210 may be configured to transmit the motor controller 220 instructions for terminating the fuel cell stack diagnosis (S107), and the motor controller 220 may be configured to receive the instructions from the fuel cell controller 210 and drive the motor adjusted to a second efficiency value (S109). In particular, the first efficiency value may less than the second efficiency value. Driving the motor adjusted to the first efficiency value for the first reference time period may purposely and inefficiently operate the fuel cell stack. The fuel cell controller 210 may be configured to transmit to the motor controller 220 instructions for initiating a fuel cell stack diagnosis. When the predetermined first reference time period has elapsed, the fuel cell controller 210 may be configured to transmit to the motor controller 220 instructions for terminating the fuel cell stack diagnosis.

A motor output while driving a motor adjusted to the first efficiency value may be the same as that while driving the motor adjusted to the second efficiency value. The fuel cell controller 210 may be configured to intentionally degrade the motor driving efficiency, but the motor output may be maintained substantially constant for a steady driving quality. The second efficiency value may be a normal efficiency value of the motor controller 220. The normal efficiency may be a maximum efficiency operating point of the motor controller 220 (or the inverter) available in operating the fuel cell stack diagnostic system 200. In addition, driving the motor adjusted to the first efficiency value, which may be less than the second efficiency value may intentionally decrease efficiency of the motor controller 220.

Particular, as the output from the fuel cell stack moved to the motor increases, the energy consumption of the fuel cell stack may increase, and the voltage of the fuel cell stack may decrease steeply. In other words, when the motor is driven to the second efficiency value, which is a normal efficiency value, after it is driven to the first efficiency value for a predetermined first reference time period, the current may be interrupted as much as the difference between the first and second efficiency value. Consequently, the voltage of the fuel cell stack may increase rapidly, and an ohmic value may be measured using the voltage variance. When measuring the voltage variance, the motor controller 220 may be configured to measure an increased gradient of the voltage and samples the voltage value in units of µ s. Accordingly, a separate high speed data analyzer may be eliminated.

The motor controller 220 may be configured to collect data regarding the voltage variance before the elapse of the predetermined second reference time period by measuring the voltage variance between when driving the motor adjusted to the first efficiency value and second efficiency value (S111); analyze an ohmic value based on the collected data (S113); and transmit the analyzed resistance value to the fuel cell controller 210. Measurement of the voltage variance may be commenced before the first reference time period in which the motor is driven to the first efficiency value has elapsed, and may be terminated before the second reference time period in which the motor is driven to the second efficiency value has elapsed. When measuring the voltage variance is started before the first reference time period has elapsed, it may be possible to measure the voltage variance of the fuel cell stack between driving the motor adjusted to the first efficiency value and second efficiency value. The fuel cell controller 210 may further be configured to receive the analyzed resistance value, and diagnose the state of the fuel cell stack (S115). The fuel cell controller 210 may then be configured to determine whether currently the fuel cell stack is dry-out (S117), and if so, perform a dry-out recovery driving (S119).

Figure 3A:
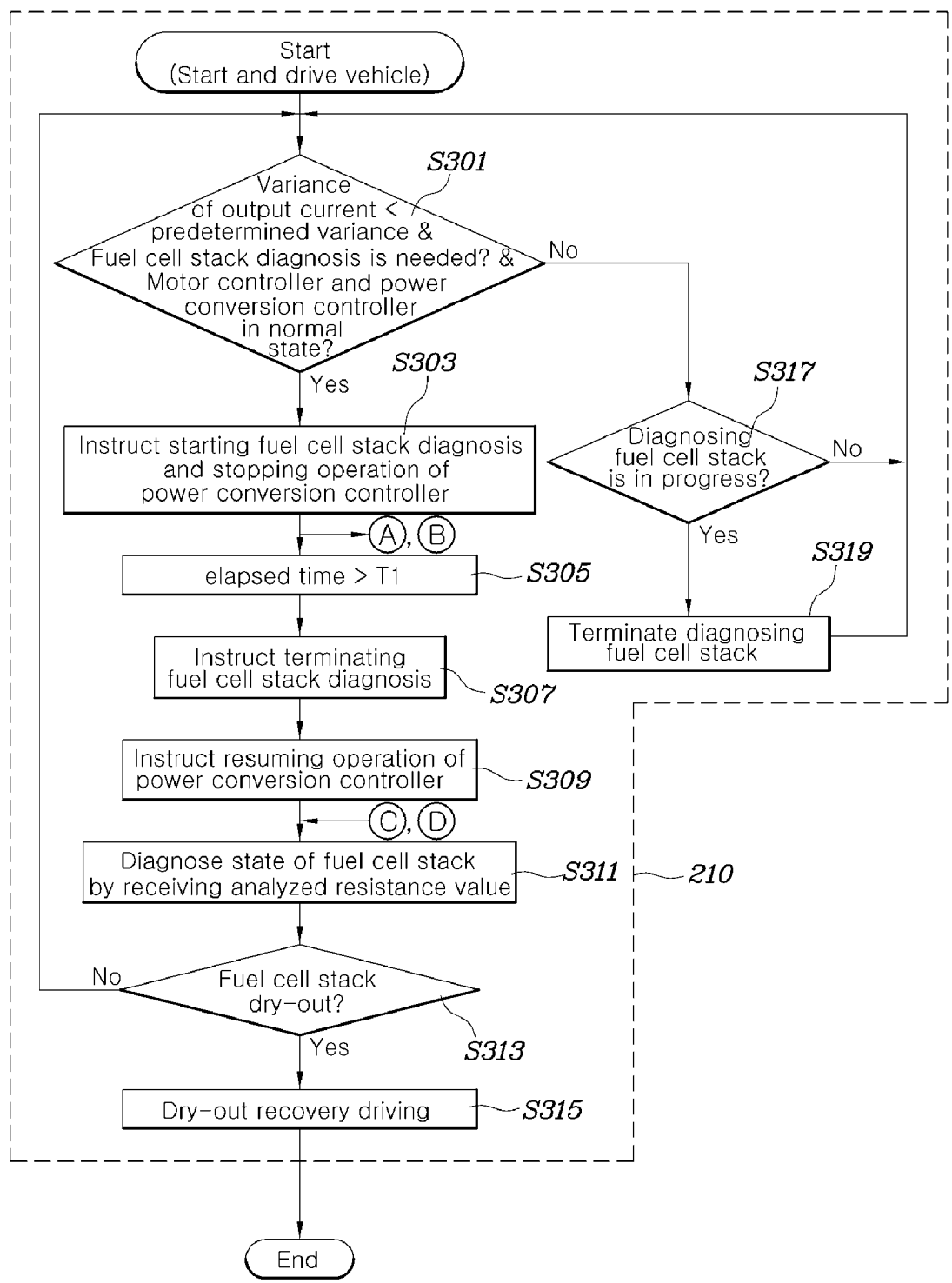
FIGS. 3A and 3B are exemplary flowcharts illustrating a method for diagnosing a fuel cell stack according to an exemplary embodiment of the present invention.
Figure 3B:
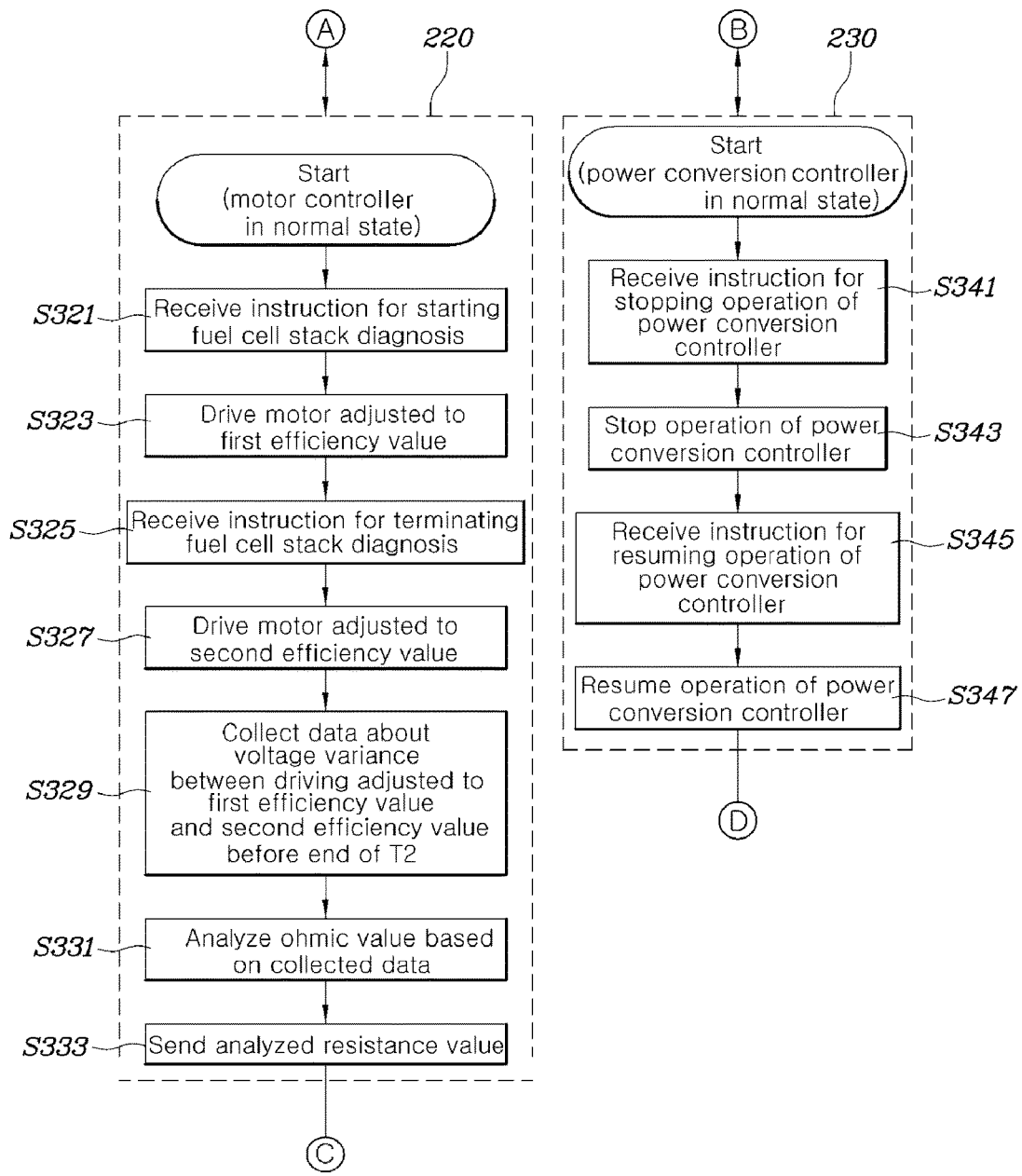
Figure 4A:
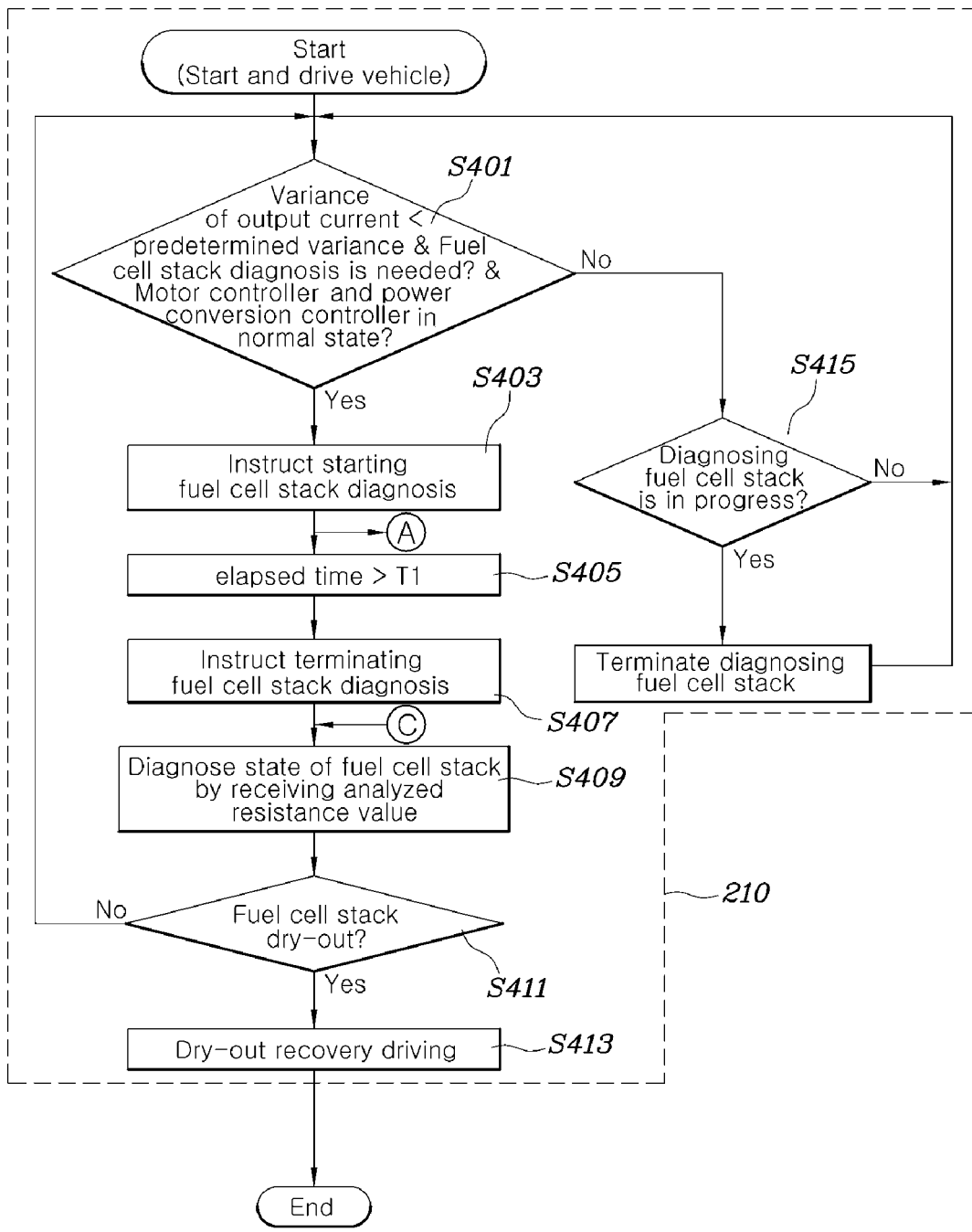
FIGS. 4A and 4B are exemplary flowcharts illustrating a method for diagnosing a fuel cell stack according to another exemplary embodiment of the present invention.
Figure 4B:
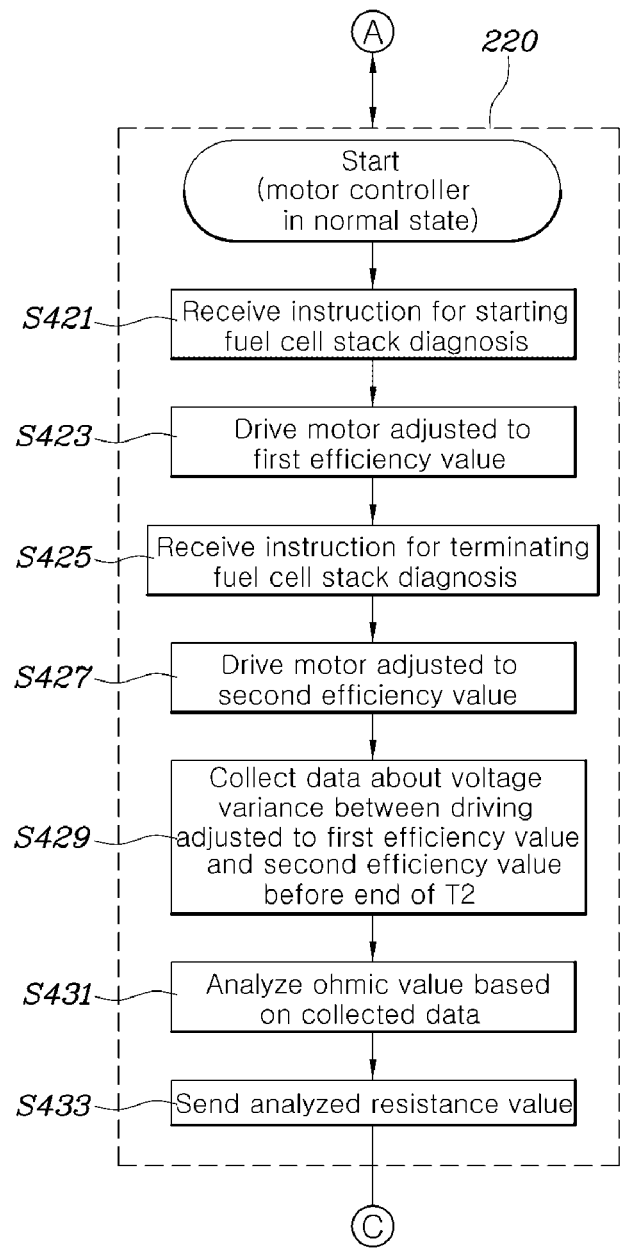

FIGS. 3A and 3B are exemplary flowcharts more specifically illustrating a method for diagnosing a fuel cell stack according to an exemplary embodiment of the present invention. Referring to FIGS. 3A and 3B, logic in the fuel cell controller 210, and logic in the motor controller 220 and power conversion controller 230 is illustrated, respectively, and the relations between the controllers is understood through the figures. FIGS. 3A and 3B illustrate a method for diagnosing a fuel cell stack for a hybrid vehicle. For a fuel cell vehicle that uses fuel cells as a driving source, a control process related to the power conversion controller 230 may be excluded, and a corresponding flowchart is illustrated in FIGS. 4A and 4B.

Examining logic in the fuel cell controller 210, the fuel cell controller 210 may be configured to determine whether a fuel cell stack diagnosis is necessary, whether a variance of an output current of the fuel cell stack is less than a predetermined variance, and whether the motor controller 220 and the power conversion controller 230 are in a normal state (S301). In response to determining that the fuel cell stack diagnosis is necessary; the variance of the output current of the fuel cell stack is less than the predetermined variance; and the motor controller 220 and the power conversion controller 230 are in a normal state, the fuel cell controller 210 may be configured to transmit to the motor controller 220 instructions for initiating the fuel cell stack diagnosis, and transmit to the power conversion controller 230 instructions for stopping an operation of the power conversion controller (S303).

When the first reference time period has elapsed (S305), the fuel cell controller 210 may be configured to transmit to the motor controller 220 instructions for terminating the fuel cell stack diagnosis (S307), and transmit to the power conversion controller 230 instructions for resuming the operation of the power conversion controller 230 (S309). Further, the fuel cell controller 210 may be configured to diagnose whether the fuel cell stack is in a dry-out state based on the analyzed ohmic value received from the motor controller 220 (S311). In response to determining that the fuel cell stack is dry-out (S313), the fuel cell controller 210 may be configured to operate a dry-out recovery driving of the fuel cell stack (S315).

Moreover, in response to determining that the fuel cell stack diagnosis is not necessary; the variance of the output current of the fuel cell stack may be the predetermined variance or greater, or the motor controller 220 or power conversion controller 230 are not in a normal state, the fuel cell controller 210 may be configured to determine whether the fuel cell stack diagnosis is in progress (S317). In response to determining that the fuel cell stack diagnosis is in progress, the fuel cell controller 210 may be configured to terminate the fuel cell stack diagnosis (S319).

Furthermore, examining logic in the motor controller 220, when the motor controller 220 is in a normal state, the motor controller 220 may be configured to receive instructions for initiating the fuel cell stack diagnosis from the fuel cell controller 210 (S321). When receiving the instruction for initiating the fuel cell stack diagnosis, the motor controller 220 may be configured to drive the motor adjusted to the first efficiency value during the predetermined first reference time period (T1) (S323). After the first reference time period has elapsed, the motor controller 220 may be configured to receive instructions for terminating the fuel cell stack diagnosis (S325). When receiving the instruction for terminating the fuel cell stack diagnosis, the motor controller 220 may be configured to drive the motor adjusted to the second efficiency value (S327). The motor controller 220 may further be configured to measure the voltage variance of the fuel cell stack between driving the motor adjusted to the first efficiency value and second efficiency value, and collect data regarding the voltage variance (S329). The motor controller 220 may then be configured to analyze the ohmic value based on the collected data (S331), and transmit the analyzed resistance value to the fuel cell controller 210.

Additionally, examining logic in the power conversion controller 230, the power conversion controller 230 may be configured to receive instructions for stopping an operation of the power conversion controller from the fuel cell controller 210 (S341). When receiving the instruction for stopping an operation of the power conversion controller (off), the power conversion controller may be configured to stop the operation. Stopping the operation may include interrupting energy flow of the high voltage battery. When receiving instructions for resuming the operation of the power conversion controller (on), the power conversion controller 230 may be configured to resume the operation.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly the essential technical configuration of the present invention to be protected should be defined by the accompanying claims.

What is claimed is:

1. A method for diagnosing a fuel cell stack, comprising:
determining, by a controller, a time at which diagnosing a fuel cell stack is required based on a plurality of factors;
driving, by the controller, a motor adjusted to a first efficiency value during a predetermined first reference time period from the time of diagnosis determination;
driving, by the controller, the motor adjusted to a second efficiency value after the first reference time period has elapsed;
diagnosing, by the controller, a state of a fuel cell stack based on a voltage variance of the fuel cell stack between driving the motor adjusted to the first efficiency value and second efficiency value; and
performing, by the controller, a dry-out recovery driving when the fuel cell stack is diagnosed as a dry-out state.

2. The method of claim 1, further comprising:
determining, by the controller, whether a variance of an output current of the fuel cell stack is less than a predetermined variance.

3. The method of claim 1, wherein the first efficiency value is less than the second efficiency value.

4. The method of claim 1, wherein an output of the motor in the driving of the motor adjusted to the first efficiency value is the same as that in the driving of the motor adjusted to the second efficiency value.

5. The method of claim 1, further comprising:
collecting, by the controller, data regarding a voltage variance by measuring a voltage variance during a predetermined second reference time period; and
diagnosing, by the controller, a state of the fuel cell stack by analyzing a resistance value based on the collected data.

6. The method of claim 1, further comprising:
stopping, by the controller, an operation of a power conversion controller that adjusts charge and discharge of a high voltage battery between the high voltage battery and a fuel cell stack before the driving of the motor adjusted to the first efficiency value.

7. The method of claim 6, further comprising:
resuming, by the controller, the operation of the power conversion controller when the diagnosis is terminated.

8. A method for diagnosing a fuel cell stack, comprising:
determining, by a controller, whether a variance of an output current of the fuel cell stack is less than a predetermined variance, whether diagnosing of the fuel cell stack is required, and whether a motor controller and a power conversion controller are in a normal state;
transmitting, by the controller, to the motor controller instructions for initiating a fuel cell stack diagnosis based on a result of the diagnosis determination, and stopping an operation of the power conversion controller, the instruction being for driving a motor adjusted to a first efficiency value during a predetermined first reference time period;
when the predetermined first reference time period has elapsed, transmitting, by the controller, to the motor controller instructions for terminating a fuel cell stack diagnosis to drive the motor adjusted to a second efficiency value, and resuming the operation of the power conversion controller;
diagnosing, by the controller, a state of the fuel cell stack based on a voltage variance of the fuel cell stack between when driving the motor adjusted to the first efficiency value and second efficiency value; and
performing, by the controller, a dry-out recovery driving when the fuel cell stack is diagnosed as a dry-out state.

9. A system for diagnosing a fuel cell stack, comprising:
a fuel cell controller configured to diagnose a state of the fuel cell stack by determining a time when diagnosing a fuel cell stack is required based on a plurality of factors, and perform a dry-out recovery driving when the fuel cell stack is diagnosed as a dry-out state; and
a motor controller configured to drive a motor adjusted to a first efficiency value for a predetermined first reference time period based on a result of the diagnosis determination, drive the motor adjusted to a second efficiency value when the first reference time period has elapsed, and transmit to the fuel cell controller a resistance value analyzed based on a voltage variance of the fuel cell stack between driving the motor adjusted to the first efficiency value and second efficiency value, wherein the fuel cell controller is configured to diagnose a state of the fuel cell stack based on the transmitted resistance value.

10. The system of claim 9, wherein the fuel cell controller is configured to determine whether a variance of an output current of the fuel cell stack is less than a predetermined variance.

11. The system of claim 10, wherein the fuel cell controller is configured to operate the motor controller to drive the motor adjusted to a first efficiency value when diagnosing the fuel cell stack is required and the variance of an output current of the fuel cell stack is less than the predetermined variance.

12. The system of claim 9, further comprising:

a power conversion controller configured to adjust charge and discharge of a high voltage battery between the high voltage battery and the fuel cell stack, wherein the fuel cell controller is configured to determine whether the power conversion controller and the motor controller are in a normal state.

13. The system of claim 12, wherein the fuel cell controller is configured to stop an operation of the power conversion controller and operate the motor controller to drive the motor adjusted to a first efficiency value in response to determining that the power conversion controller and the motor controller are in a normal state.

14. The system of claim 9, wherein the first efficiency value is less than the second efficiency value.

15. The system of claim 9, wherein an output of the motor when driving the motor adjusted to a first efficiency value is the same as that when driving the motor adjusted to a second efficiency value.

16. The system of claim 13, wherein the fuel cell controller is configured to resume the operation of the power conversion controller when the diagnosis is complete.

17. A non-transitory computer readable medium containing program instructions executed by a controller, the computer readable medium comprising:

program instructions that determine a time at which diagnosing a fuel cell stack is required based on a plurality of factors;

program instructions that drive a motor adjusted to a first efficiency value during a predetermined first reference time period from the time of diagnosis determination;

program instructions that drive the motor adjusted to a second efficiency value after the first reference time period has elapsed;

program instructions that diagnose a state of a fuel cell stack based on a voltage variance of the fuel cell stack between driving the motor adjusted to the first efficiency value and second efficiency value; and program instructions that perform a dry-out recovery driving when the fuel cell stack is diagnosed as a dry-out state.

18. The non-transitory computer readable medium of claim 17, further comprising:

program instructions that determine whether a variance of an output current of the fuel cell stack is less than a predetermined variance.

19. The non-transitory computer readable medium of claim 17, wherein the first efficiency value is less than the second efficiency value.

20. The non-transitory computer readable medium of claim 17, wherein an output of the motor in the driving of the motor adjusted to the first efficiency value is the same as that in the driving of the motor adjusted to the second efficiency value.

* * * * *